US005366639A

United States Patent [19]

Jones et al.

[11] Patent Number: 5,366,639

[45] Date of Patent: Nov. 22, 1994

[54] PROCESS OF SEPARATING USING A ROTATING SCREEN

[75] Inventors: Thomas R. Jones; Reginald L. Phillips, both of St. Austell, Great Britain

[73] Assignee: ECC International Ltd., Cornwall, United Kingdom

[21] Appl. No.: 910,140

[22] PCT Filed: Jul. 20, 1990

[86] PCT No.: PCT/GB90/01115

§ 371 Date: Jul. 14, 1992

§ 102(e) Date: Jul. 14, 1992

[87] PCT Pub. No.: WO91/01815

PCT Pub. Date: Feb. 21, 1991

[30] Foreign Application Priority Data

Aug. 4, 1989 [GB] United Kingdom ................. 8917893

[51] Int. Cl.[5] ................................................ B01D 21/26

[52] U.S. Cl. ................................. 210/787; 210/380.1; 210/382.388; 209/18; 209/270; 209/273; 209/683

[58] Field of Search ................. 209/12, 279, 287, 291, 209/292, 301, 350, 198, 351, 350.1, 18, 683, 270, 273; 210/787, 785, 380.1, 382, 388, 780

[56] References Cited

U.S. PATENT DOCUMENTS 931,280 8/1909 Cunningham ....................... 209/350
1,146,932 7/1915 Fowler ................................ 209/301
3,061,095 10/1962 O'Malley .............................. 209/12

*Primary Examiner*—Robert A. Dawson
*Assistant Examiner*—David Reifsnyder

[57] ABSTRACT

A method of and apparatus for continuously separating relatively coarse particles from a suspension of mixture of particles in a liquid by impinging the suspension upon the surface of a rotating screen so that liquid containing the relatively fine particles passes through the screen and the relatively coarse particles are flung radially outwardly to the periphery of the screen the preferred screen is a woven wire mesh with aperture sizes conveniently in the size range from about 0.020 mm to about 2.00 mm.

15 Claims, 3 Drawing Sheets

PROCESS OF SEPARATING USING A ROTATING SCREEN

BACKGROUND OF INVENTION

This invention concerns an improved screening process and apparatus for separating coarse particles from a suspension of a particulate solid material in a liquid.

Coarse particles are conveniently separated from a suspension of a particulate solid material in a liquid by means of a screen or sieve which generally consists of a perforated plate, a grid or grating or a mesh material. The mesh may be of metallic or plastics material. When the coarse particles to be separated are relatively small, i.e. in the size range from about 0.040 mm to 1 mm, a wire mesh material is the preferred separating medium.

Especially when the suspension contains a relatively large proportion of solid particles of relatively coarse size it is generally necessary to agitate the screen, for example by applying vibration thereto by means of an electric motor connected to the screen through a suitable reciprocating linkage. Such means increase the cost of the screening operation and lead to more rapid wear and consequent tearing of the screen or sieve. The screening apparatus is also noisy in operation.

Screening processes generally also suffer from the disadvantage that constant supervision is necessary because there is a tendency for the screens to blind or become blocked with solid particles which in turn causes unscreened suspension to overflow from the screens by the route intended for the oversize particles with consequent waste of fine particles.

It is known to provide screening apparatus in the form of a trommel of screening material rotating about substantially horizontal axis, which was intended to overcome the disadvantages associated with a vibrating screening device. Such an apparatus is describd in British Patent No. 2053736. However the apparatus, although quieter and less susceptible to wear and fracture of the separating medium, suffered from blinding of the screen by coarse particles.

A screening apparatus having coaxial conical or frusto-conical screens which are rotatable at different angular velocities and in different directions about a vertical axis is known from European Patent Specification No. 0278124. According to one embodiment described in that Patent specification a mixture of fine and coarse particles is dumped near the apex of an upper conical screen rotating with its apex upward. Particles retained on the screen move to the periphery of this screen and are transferred to a lower frusto-conical screen rotating with its imaginary apex downwards and in the opposite direction. Fine particles pass through the two rotating screening surfaces while the coarse particles are eventually discharged over the peripheral rim of the lower frusto-conical screen. The apparatus is designed for dry separations, for example for separating dust or ultrafine particles from cattle feed pellets [column 1, lines 46–49].

A screening apparatus having at least one circular screening member rotating in its own plane about a central axis is known from British Patent specification No. 2088750. However in that case the screening member consists of an array of radially extending bars or rods which together make up a grating and the apparatus is for dry separation of relatively coarse solid material such as coal.

Rotary screening apparatus is also known from U.S. Pat. No. 3,061,095, which shows a screen formed as a shallow cone having a vertical rim around its periphery. German Patent 41604 has rotary screens which are planar and provided with an annular rim. In each of the above the peripheral speed of the screens needs to be such as to give a centrifugal force capable of driving the coarse particles of the suspension upwardly and over the edge of the rim of the screen.

German 0LS2018677 discloses a rotary screen whose surface extends upwardly towards its periphery. Similarly, the peripheral speed of the screen needs to be sufficiently high to drive the coarse particles upwardly across the surface of the screen and over its edge.

In the above three patents the rotational speed necessary to drive the coarse particles of the suspension over the rims of the screens is found to rapidly blind the screens and an optimum speed which would not cause blinding of the screens is insufficient to centrifuge the coarse particles over the rims.

According to the invention there is provided a process for continuously separating relatively coarse particles from a suspension of a mixture of particles in a liquid wherein the suspension is caused to impinge upon a surface of a screening medium which is rotating in its own plane about a vertical axis so that the relatively coarse particles are retained on the surface of the screening medium and are caused to move radially outwardly towards the periphery of the screening medium while the liquid containing relatively fine particles passes through the screening medium and wherein the screening medium comprises a pervious material which is substantially planar and whose periphery lies in the same plane as the surface of the screening medium so that the relatively coarse particles are caused to pass unencumbered outwardly and downwardly from the periphery of the screening medium.

The suspension may be caused to impinge on the surface of two or more similar screening media in series, and these screening media may be disposed one above the other. The screening medium or media may be rotated at changing speed cycles during the screening operation.

It is preferred that the suspension containing the mixture of particles is caused to impinge on the surface of the rotating screen medium at or near the centre of rotation of the screening medium.

The suspension containing the mixture of particles may be prevented from passing through part of the screening medium or media by reason of an impervious annular band adjacent the periphery or peripheries of the screening medium or media.

In a preferred form the process is performed continuously and the coarse particles of the suspension are caused to travel radially across the screening medium without causing obturation of the passageways therein.

The suspension containing the mixture of the particles may be assisted in its passage through the screening medium or media by vibration of said screening medium or media in addition to its being rotated.

The invention further includes apparatus for continuously separating relatively coarse particles from a suspension of a mixture of particles in a liquid including a screening medium rotatable in its own plane about a vertical axis and capable of causing the relatively coarse particles to move radially outwards to the periphery of the screening medium, characterised in that the screening medium comprises a finely woven mesh screen or a perforated plate whose periphery lies on the same plane as the surface of the screening medium and is free of any encumbrance which would prevent the relatively coarse particles passing outwardly and downwardly from the periphery of the screening medium.

Two or more similar screening media may be provided in which case they are disposed one above the other.

Preferably there is provided means to cause the mixture of particles to impinge on the surface of the rotating screen medium or media at or near the centre of rotation of the screening medium or media.

Means may also be provided to collect and discharge coarse particles which overflow from the periphery of the sceening medium and there may be further provided means for vibrating the screen medium or media in addition to the means for rotating said medium or media.

The screening medium or media may be provided with an impervious or imperforate annular band adjacent its periphery or their peripheries.

The efficiency of the screening device according the invention depends on the peripheral speed of the screen. When the screen is stationary it rapidly blinds with coarse particles and the percentage by volume of the feed suspension which passes through the screen rapidly decreases. When the screen is rotated at relatively low speeds, i.e. with a peripheral speed of up to about 2 ms $^{-1}$, most of the feed suspension is flung off the screen by centrifugal action, due to the at least partial blinding of the screen.

Surprisingly, when the rotational speed of the screen is within a critical range from around 2 $ms^{-1}$ to 10 $ms^{-1}$ for many typical feed suspensions, there is a dramatic decrease in the amount of suspension which is flung off, with the result that most of the feed suspension then flows through the screen.

In experiments it was found that, at an optimum peripheral speed for a particular feed suspension, up to 95% by volume of the feed suspension passed through the screen. In view of the relatively high viscosity of the feed suspension this is a most surprising result.

In comparison with the conventional type of vibratory screen, the rotary screen is found to have about five times the capacity on the basis of flow rate per unit area.

Also the wear and tear and the noise of conventional vibratory screens as well as the tendency for the screen cloth to rupture through fatigue are unacceptable and the use of a rotary screen overcomes these further disadvantages.

Various embodiments of the invention will now be described, by way of example, with reference to the accompanying drawings in which.

Figure 1:
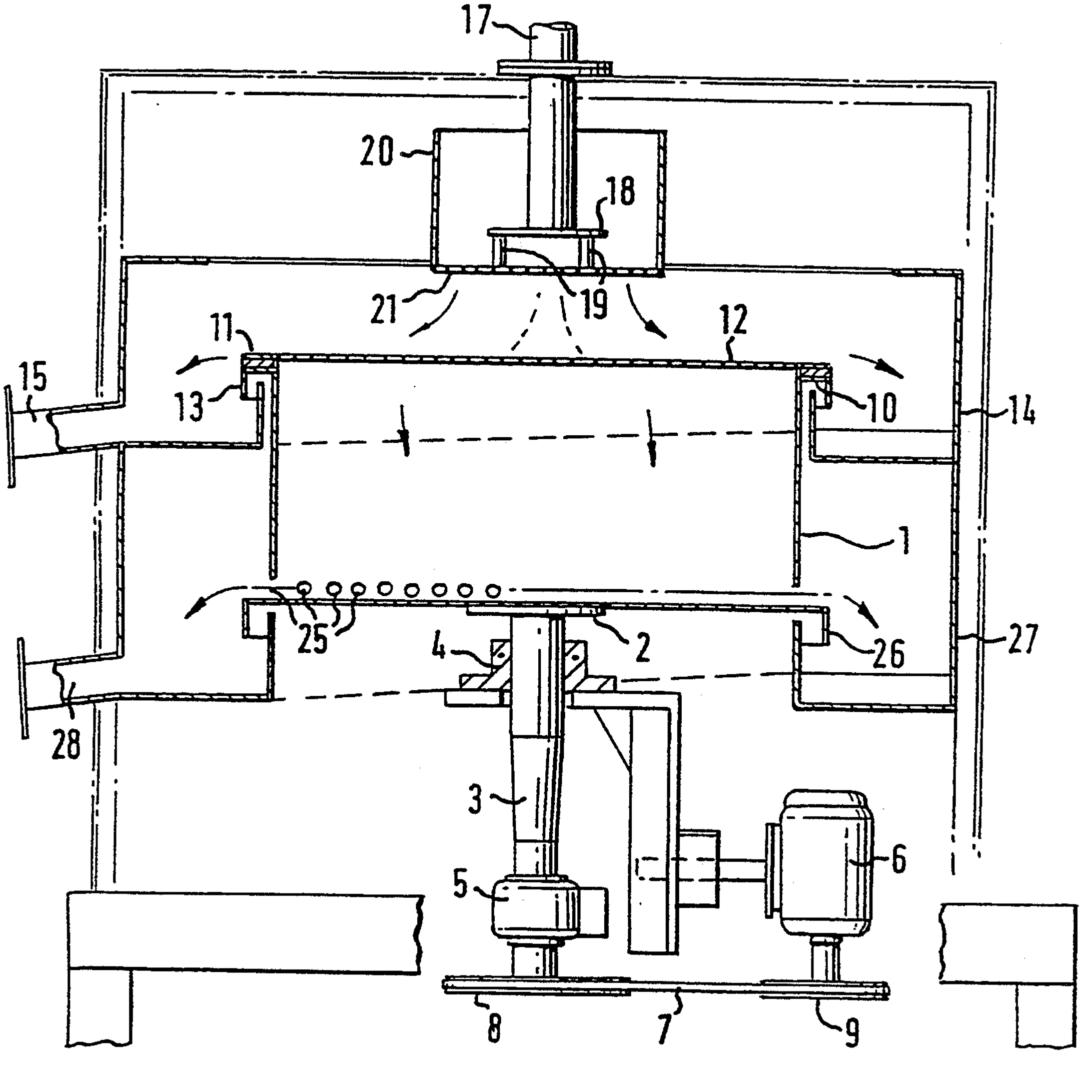
FIG. 1 is a diagrammatic view in section of one embodiment of a screening device according to the invention.

As seen in FIG. 1, a hollow drum 1, open at the top, is mounted on a boss 2 which is keyed and bolted on to the upper end of a shaft 3 which is supported in bearings 4 and 5 and rotated by means of an electric motor 6, the drive being transmitted by a belt 7 passing over pulleys 8 and 9. The upper rim of the drum 1 is provided with a flange 10 to which is bolted an annular member 11 to which is clamped a circular piece of woven wire mesh screen cloth 12 having a nominal aperture size of 0.053 mm. Also clamped to the upper rim of the drum 1 is an annular skirt member 13 of L-shaped cross section over which coarse particles which are retained on the screen cloth and which are caused to move to the periphery of the screen cloth under centrifugal action pass into a collecting launder 14 having an outlet 15 is provided below and adjacent to the skirt member.

The drum 1 is provided around the lower part of its periphery with a number of holes 25. The drum is also closed at its lower end and has a lower skirt member 26 beneath which is located a collecting launder 27 having an outlet 28.

An inlet pipe 17, is provided at its lower end with a flange 18 and a hollow cylindrical shell 20 is suspended therefrom by bolts passing through spacing members 19. The shell is open at its upper end and its lower end is formed by a foraminous plate 21 in order to minimize the danger of damage which could occur to the screen cloth 12 by any large size particles falling directly on to it. The plate 21 is provided with holes of from 5 mm. to 10 mm. in diameter which is sufficient to retard the mixture on its passage to the rotating screen cloth. The mixture is generally screened through a sieve of approximately 2 mm. before being introduced into the apparatus of the invention but the foraminous plate is nevertheless found to be advantageous and prolongs the life of the screen cloth.

To further prolong the life of the screen cloth 12, one or more additional foraminous plates, or coarse screens, may be provided between the plate 21 and the screen cloth.

In use, a mixture of coarse and fine particles, in suspension, is introduced through the pipe 17 and passes through the foraminous plate onto the rotating screen cloth 12 where the relatively fine particles pass through the screen into the interior of the drum 1 to pass through the holes 25 and thence via the launder 27 to the outlet 28.

The relatively coarse particles, which do not pass through the screen cloth are urged, under centrifugal action, towards the periphery of the drum from where they pass over the annular skirt member into the launder 14 and thence to the outlet 15.

In order to ensure that there is no back-flow of particles in suspension from the area surrounding the skirt 13 to return to the interior of the drum 1 by way of the peripheral upper surface of the screen 12, the peripheral area of the screen is formed so as to be impervious. It may be coated with an annular band of a rubber latex, or alternatively an annular band of plastics or metal foil may be secured in place by an adhesive or by otherwise welding it to the upper or lower surface of the screen medium. In the case of a screen member being perforated plate, the annular band may simply be left unperforated.

Figure 2:
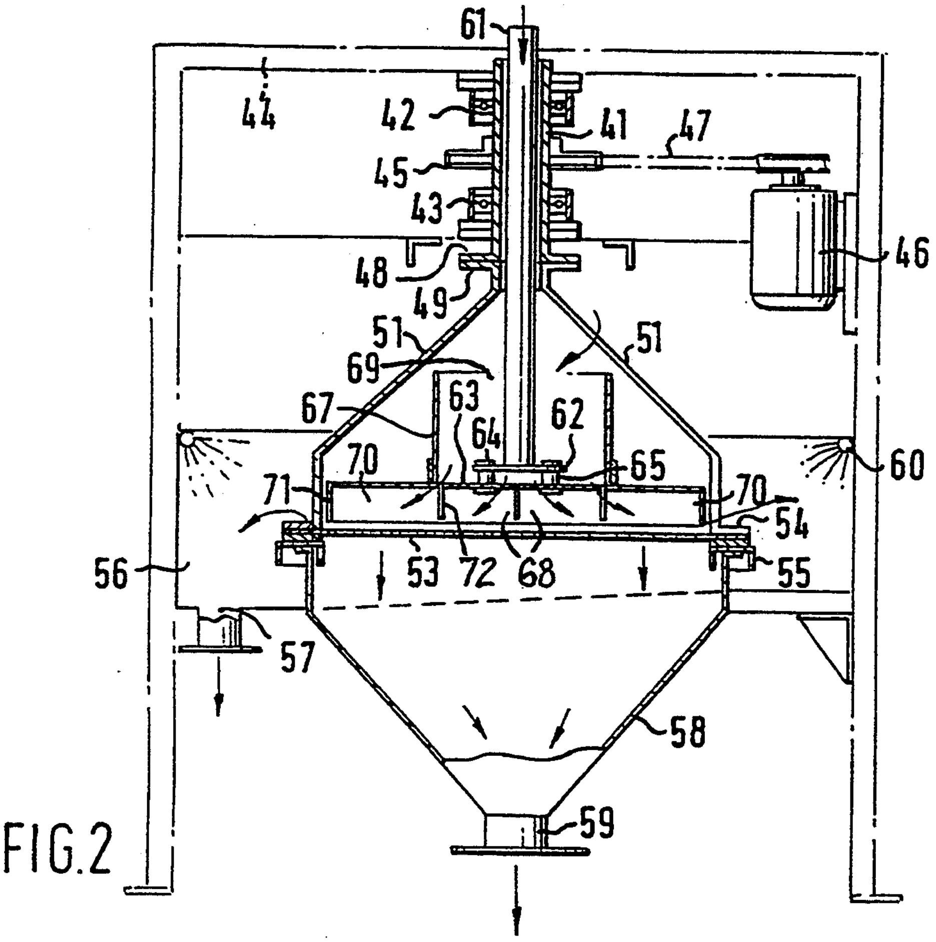
FIG. 2 is a section view of a second embodiment on the line II—II of FIG. 3.
Figure 3:
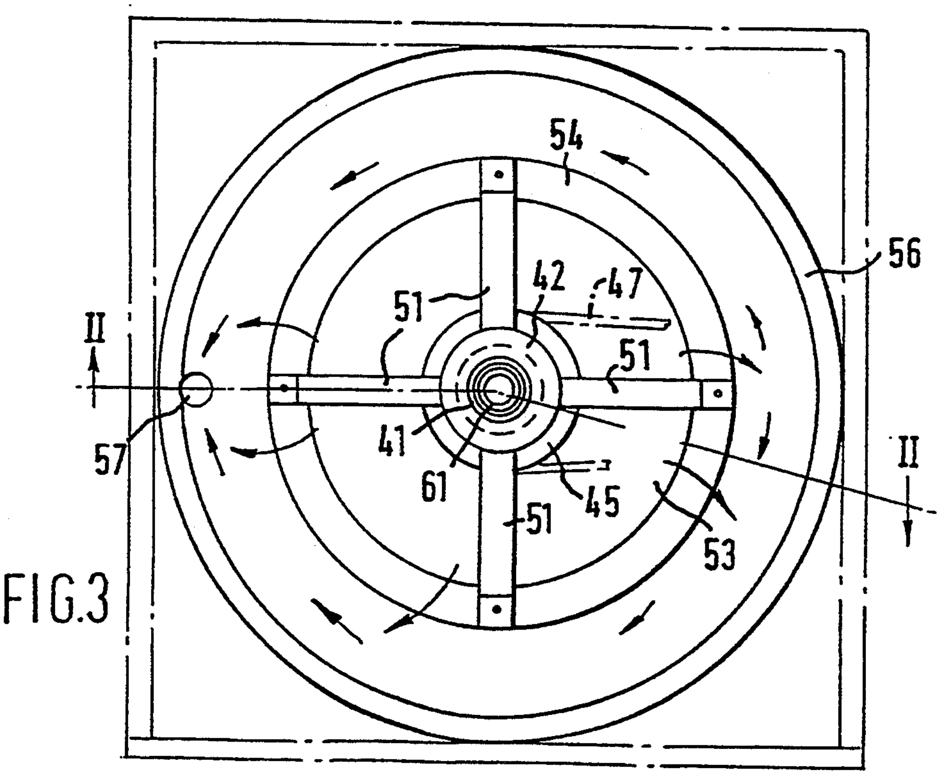
FIG. 3 is a plan view of the second embodiment.

In the embodiment seen in FIGS. 2 and 3, a hollow shaft 41 is rotatable in bearings 42 and 43 mounted on the framework 44 of the device. A pulley 45, fast on the shaft 41 is driven by an electric motor 46 via a belt 47. The shaft is formed with a flange 48 which is connected by bolts to a flange 49 from which four arms 51 depend downwardly and outwardly and are connected to an annular flange 54. A circular sheet of woven mesh screen cloth 53 is secured to the lower face of the flange 54 and an annular skirt 55 of inverted channel section is secured to its lower face.

A launder 56 underlies the skirt 55 and has opening 57 and mounted in the launder area is a number of sprays 60. A frusto-conical collecting chamber 58 is mounted beneath the screen cloth 53 and has an outlet 59.

Located axially within the hollow shaft 41 is a feed pipe 61 which has a flange 62 at its lowermost end, and a circular foraminous plate 63 is secured by bolts 64 and spacers 65 to the flange. The periphery of the plate 63 is secured to the upstanding walls of a cylindrical shell 67 which is provided with an opening 69 at its uppermost part to allow passage therethrough of the pipe 61.

Extending radially from the shell 67 and secured thereto are radial form plate members 70 which are vertically disposed with a slight clearance with respect to the upper surface of the screen cloth 53. An annular shell 71 is secured to the outermost ends of the radial form plates 70 and it also is disposed with a slight vertical clearance between its lower edge and the screen cloth, the clearance being sufficient to allow passage therethrough of the largest particle likely to be present in the mixture.

Depending downwardly from the foraminous plate 63 are radial form plates 68 which have secured at their outermost ends an annular shell 72, both the shell 72 and the plates 68 providing a clearance between themselves and the screen cloth sufficient to allow radial passage of the largest particle likely to be present in the mixture.

The inner shell confines the feed suspension initially to the central region of the screen cloth. The outer shell 71 and radial form plates 70 restrict the suspension to cause it to progress generally radially outwardly and to deter any tendency for it to simply rotate with the screen cloth.

As will be understood from the above, the pipe 61, plate 63 and plate members 70 are all stationary, i.e. non-rotatable while the screen cloth 53, arms 51 and hollow shaft rotate under the drive of the electric motor 46.

In use, the mixture of coarse and fine particles suspension is fed in through the pipe 61 from where it passes through the foraminous plate 63, within the confines of the shell 67, on to the rotating screen cloth 53. The coarse particles pass to the peripheral area of the screen and drop over the flange 54 into the launder 56 and thence to the outlet 57, being assisted in their passage along the launder by water from the sprays 60.

The relatively fine particles pass in suspension through the mesh screen cloth 53 into the collecting launder 58 and through the outlet 59.

Figure 4:
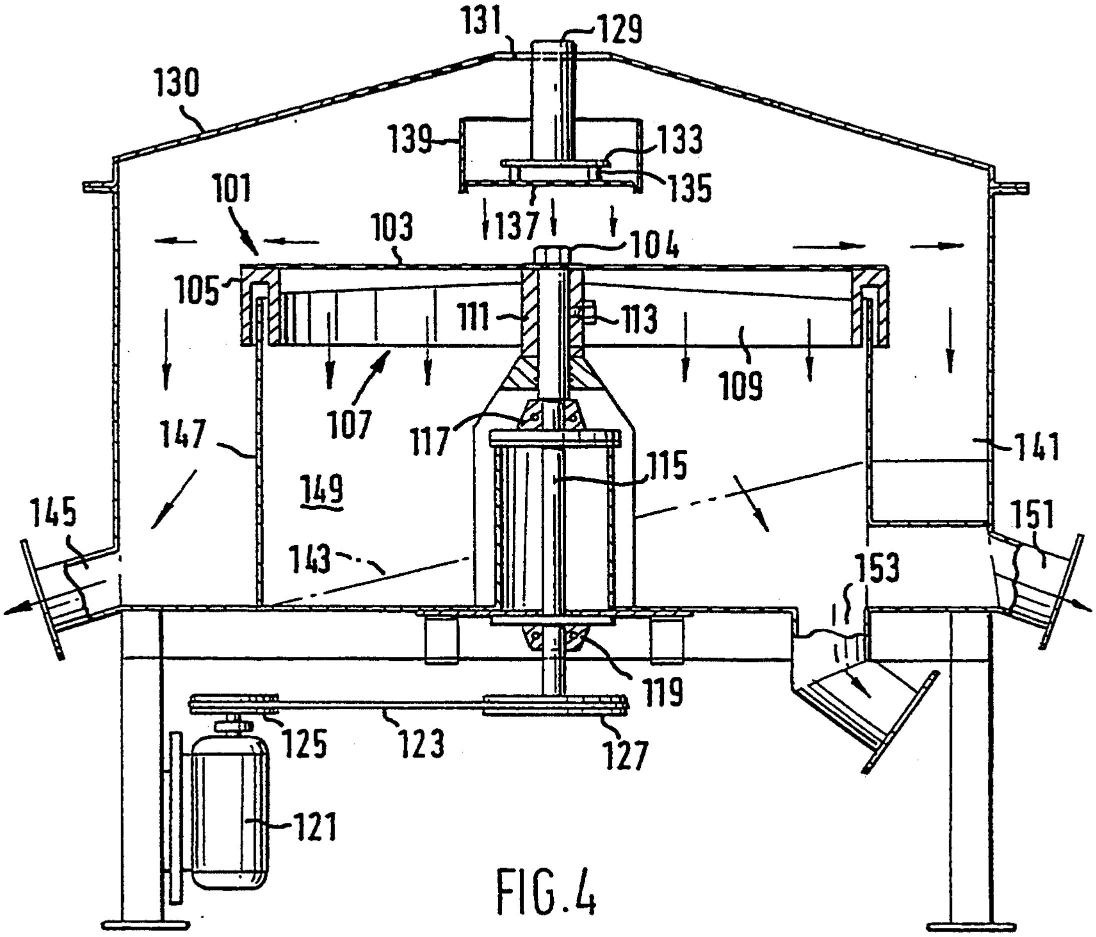
FIG. 4 is a section view of a third embodiment.
Figure 5:
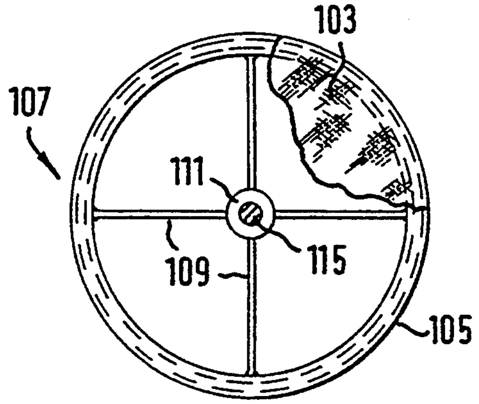
FIG. 5 is a plan view of parts seen in FIG. 4.

In the alternative embodiment illustrated in FIGS. 4 and 5, a rotating screening member 101 comprises a woven screen cloth 103 which is attached at its periphery, preferably by bonding, to a rim 105 of a spoked wheel 107. The rim is formed as an inverted channel section and is connected by spokes 109 to a central hub 111 which is detachably secured by a screw 113 to the upper end portion of a drive shaft 115. The drive shaft is rotatably supported in bearings 117, 119 and is driven by means of an electric motor 121 and a belt 123 between a pulley 125 on the motor and a pulley 127 fast on the lower end of the shaft 115. A screw 104 secures the screen cloth 103 to the hub 111.

An inlet pipe 129 enters the housing 130 through an opening 131 and at its lower end is provided with a flange 133. Suspended from the flange 133 by means of bolts passing through spacing members 135 is a foraminous plate 137 which forms the base of an open topped drum 139.

The housing 130 provides a launder 141 having a sloping floor 143, indicated in chain dot lines in FIG. 4, leading to an outlet 145. An inner cylindrical wall 147 of the launder extends upwardly to terminate within the channel formed in the rim 105 of the spoked wheel 107.

Within the cylindrical wall 147 is defined a chamber 149 provided with an outlet 151. An alternative outlet 153 may be provided in the base of the chamber 149.

In use, the motor 121 is set in motion to rotate, through pulleys 125, 127, belt 123 and shaft 115, the spoked wheel 107 and hence the screen cloth 103.

A mixture in suspension is then fed through the feed pipe 129 and the foraminous plate 137 and is deposited on the rotating screen cloth 103 when the fine particles in suspension pass through the cloth into the chamber 149 and out through the outlet 151 or 153 as desired.

Those particles which do not pass through the screen cloth 103 move radially towards the rim 105 of the wheel 107 by centrifugal action and pass over the rim into the launder 141 and eventually through the outlet 145

EXAMPLE 1

An experimental screening apparatus of the type shown in FIG. 1 was provided with a circular piece of woven wire mesh screen cloth of diameter 440 mm and aperture size 0.053 mm [No. 300 mesh British Standard sieve]. The feed was a flocculated kaolin suspension containing 20% by weight of dry kaolin in water, and this suspension was fed to the screening apparatus at two different flow rates of 0.114 $m^3.min^{-1}$ [25 gpm.] and 0.250 $m^3.min^{-1}$ [55 gpm.] respectively. The speed of rotation of the screen was 300 r.p.m. giving a peripheral speed of 6.9 $ms^{-1}$. The screening efficiency or percentage by weight of particles larger than 0.053 mm contained in the feed which are removed by the screening device, was determined for each flow rate and the results are set forth in Table I below.

TABLE I

| Flow Rate [$m^3.min^{-1}$] | % by wt. of + 0.053 mm particles removed |
|---|---|
| 0.114 | 92 |
| 0.250 | 92 |

These results show that the efficiency of the screening device remains substantially constant over a wide range of feed rates.

EXAMPLE 2

The screening device used in Example 1 was fed with a similar feed suspension to that used in Example 1 at a flow rate of 0.182 $m^3.min^{-1}$ [40 gpm.], but five different experiments were performed at five different speeds of rotation of the screen. In each case the underflow rate, or the rate of flow of suspension passing through the screen was measured and the percentage by volume of the feed suspension which appeared in the underflow was determined.

The results are set forth in Table II below:

TABLE II

| Rotational Speed [rpm] | Peripheral Speed [$ms^{-1}$] | Underflow Rate [$m^3.min^{-1}$] | % by volume of underflow |
|---|---|---|---|
| 300 | 6.9 | 0.134 | 73.5 |
| 350 | 8.1 | 0.152 | 84.0 |
| 400 | 9.2 | 0.164 | 90.0 |
| 450 | 10.35 | 0.162 | 88.7 |

TABLE II-continued

| Rotational Speed [rpm] | Peripheral Speed [$ms^{-1}$] | Underflow Rate [$m^3.min^{-1}$] | % by volume of underflow |
|---|---|---|---|
| 485 | 11.2 | 0.158 | 86.7 |

These results show that for this particular feed suspension the optimum rotational speed of the screen is about 400 r.p.m. giving an optimum peripheral speed of about 9 $ms^{-1}$.

EXAMPLE 3

The screening device used in Examples 1 and 2 was fed with a flocculated kaolin suspension containing 17% by weight of dry kaolin in water. The rotational speed of the screen was maintained constant at 400 rpm giving a peripheral speed of 9.2 $ms^{-1}$ and the suspension was fed to the screen at three different flow rates. For each flow rate the percentages by weight of particles larger than 0.053 mm in the feed and in the underflow respectively and the percentage by volume of the feed suspension which appeared in the underflow were determined and the results are set forth in Table III below:

TABLE III

| Flow rate [$m^3.min^{-1}$] | % by volume of underflow | wt. % + 0.053 mm particles in feed | wt. % + 0.053 mm particles in underflow |
|---|---|---|---|
| 0.091 | 90.5 | 0.0138 | 0.0002 |
| 0.136 | 89.0 | 0.0138 | 0.0003 |
| 0.182 | 87.5 | 0.0138 | 0.0002 |

These results show that the quality of the underflow is not affected by changes in feed rate over the range covered by this experiment and the percentage by volume passing through the screen is only very slightly affected.

EXAMPLE 4

The screening device used in the foregoing Examples was installed in a factory and run continuously over a period of several weeks. The rotational speed was maintained constant at 365 rpm giving a peripheral speed of 8.4 $ms^{-1}$ and the feed rate was maintained constant at 0.182 $m^3.min^{-1}$ [40 gpm]. Each working day several samples were taken from the feed, bulked together and tested for percentage by weight of particles larger than 0.053 mm. The underflow was sampled and tested in the same way, and the average percentage by volume of underflow for each day was determined. The results are set forth in Table IV below:

TABLE IV

| Day | % by wt. of kaolin in feed suspension | % by volume of underflow | wt. % + 0.053 mm in feed | wt. % + 0.053 mm in underflow |
|---|---|---|---|---|
| 1 | 16 | 96 | 0.0130 | 0.0005 |
| 2 | 17 | 96.5 | 0.0081 | 0.0006 |
| 3 | 16 | 94.5 | 0.0028 | 0.0005 |
| 4 | 16 | 93.7 | 0.0036 | 0.0007 |
| 5 | 16 | 95.3 | 0.0032 | 0.0006 |
| 6 | 17 | 95.0 | 0.0044 | 0.0005 |
| 7 | 15 | 90.1 | 0.0048 | 0.0009 |
| 8 | 17 | 93.6 | 0.0041 | 0.0004 |
| 9 | 18 | 93.7 | 0.0061 | 0.0004 |
| 10 | 17 | 93.5 | 0.0051 | 0.0001 |
| 11 | 17.5 | 93.4 | 0.0043 | 0.0004 |
| 12 | 19 | 92.3 | 0.0451 | 0.0006 |
| 13 | 18 | 90.9 | 0.0043 | 0.0006 |
| 14 | 20 | 92.1 | 0.0132 | 0.0006 |

These results show that the screening device in accordance with the invention reduces the percentage by weight of particles larger than 0.053 mm to very low levels when operated under factory conditions for long periods of time. It was observed that the screen showed no sign of blinding and at no stage needed to be brushed by hand to remove accumulated coarse material. It is well known that conventional vibrating screens blind rapidly and may require frequent brushing of the surface.

EXAMPLE 5

The throughput of the rotating screen was compared with the throughput of two commercially available vibrating screens. The first of these was of an old design, and had a rectangular screen cloth of area 0.4 $m^2$. When fed with a suspension of flocculated kaolin at 15 wt % solids content, the screen had a maximum capacity of 4.8 $m^3h^{-1}$. Therefore the screening capacity is 12 $m^3h^{-1}$ of slurry per square meter of screen area.

The second vibrating screen was of modern design with a circular screen cloth 1.17 meters in diameter. It was fed with a very similar kaolin suspension to the first vibrating screen. The maximum flow rate that could be sustained without slurry overflowing the screen was 16.4 $m^3h^{-1}$. Therefore the screening capacity is 15.2 $m^3h^{-1}$ of slurry per square meter of screen area.

The rotating screen was fed with a very similar kaolin suspension to the two vibrating screens described above. The maximum flow rate that could be reliably sustained for long periods of operation was 13.6 $m^3h^{-1}$. Since the screen area was 0.15 $m^2$, the screening capacity of the rotating screen is 80 $m^3h^{-1}$ of slurry per square meter of screen area.

Therefore it is concluded that the rotating screen has at least 5 times the screening capacity of a vibrating screen, on an equal area basis.

EXAMPLE 6

The screening device used in the foregoing Examples was fed with a flocculated suspension of marble powder which had been ground to a particle size distribution such that 75% by weight consisted of particles having an equivalent spherical diameter smaller than 2 microns. The suspension contained 30% by weight of dry marble in water. Portions of the marble suspension were fed to the screening device at two different feed rates for each of three different speeds of rotation of the circular screening surface.

For each feed rate and rotational speed, the percentages by weight of particles larger than 0.053 mm in the feed and underflow, respectively, and the percentage by volume of the feed suspension which appeared in the underflow were determined and the results are set forth in Table V below:

TABLE V

| Rotational Speed [rpm] | Peripheral Speed [$ms^{-1}$] | Feed Flow Rate [$m^3.min^{-1}$] | % by volume of underflow | wt. % + 0.053 mm particles in feed | wt. % + 0.053 mm particles in underflow |
|---|---|---|---|---|---|
| 325 | 7.5 | 0.15 | 95.0 | 0.4366 | 0.00037 |
| 325 | 7.5 | 0.10 | 91.2 | 0.4366 | 0.00039 |
| 200 | 4.6 | 0.15 | 97.1 | 0.4366 | 0.00045 |
| 200 | 4.6 | 0.10 | 94.2 | 0.4366 | 0.00042 |
| 0 | 0 | 0.15 | 67.0 | 0.4366 | 0.00036 |
| 0 | 0 | 0.10 | 85.0 | 0.4366 | 0.00039 |

It is to be understood that various modifications may be made to the embodiments above described without departing from the spirit of the invention.

For example, because the linear velocity of the central portion of the screen is very small, it may be advantageous to provide an inverted conical member between the foraminous plate and the screen in order to ensure that the mixture passing down the feed-in pipe is initially spread some distance from the vertical axis of rotation of the screen.

In a further modification, the screen 12, as well as rotating, may be vibrated, for example, by ultrasonics.

It is sometimes found to be advantageous to rotate the screen at varying speed cycles, and a control system may be provided to that end. Thus, the powder input to the electric drive motors may be provided with an overriding or manual control. The programme may be arranged to vary the peripheral speed from zero to a maximum of, say 15 $ms^{-1}$. It may also be arranged to vary the direction of rotation if so desired.

We claim:

1. A process for continuously separating coarse particles and fine particles from a suspension of a mixture of particles in a liquid wherein the suspension is caused to impinge upon a surface of a screening medium which is rotating in its own plane about a vertical axis so that the coarse particles are retained on the surface of the screening medium and are caused to move radially outwardly towards the periphery of the screening medium while the liquid containing relatively fine particles passes through the screening medium wherein the screening medium comprises a pervious material which is substantially planar and whose periphery lies in the same plane as the surface of the screening medium and the coarse particles are caused to pass unencumbered outwardly and downwardly from the periphery of the screening medium.

2. A process for continuously separating coarse particles and fine particles from a suspension of a mixture of particles in a liquid wherein the suspension is caused to impinge upon the surface of a substantially planar screening medium which is rotating in its own plane about a substantially vertical axis so that the coarse particles are retained on the surface of the screening medium and are caused to move rapidly outwardly towards the periphery of the screening medium while the liquid containing the fine particles passes through the screening medium into an open top hollow drum which is disposed beneath the screening medium and rotates about a substantially vertical axis, wherein said liquid containing the fine particles passing through the screening medium is deposited on a closed lower end of the drum and said liquid in the drum is displaced from the drum during rotation thereof in a direction radially outwardly of said drum's rotational axis through an array of holes provided in the periphery of the drum.

3. A process according to claim 2 wherein the screening medium is rotated at changing speed cycles during the screening operation.

4. A process according to claim 2 wherein the suspension containing the mixture of particles is prevented from passing through part of the screening medium by reason of an impervious annular band adjacent the periphery of the screen.

5. A process according to claim 4 conducted on a batch wise basis wherein a suitable dam is provided around the periphery of the screening medium against which the coarse particles build up.

6. A process according to claim 2 wherein the suspension containing the mixture of the particles is assisted in its passage through the screening medium by vibration of said screening medium in addition to rotation of said screen medium.

7. Apparatus for continuously separating coarse particles and fine particles from a suspension of a mixture of particles in a liquid by the process as claimed in claim 2, said apparatus comprising a substantially planar screening medium mounted to be rotatable in its own plane about a substantially vertical axis;

means for depositing said suspension onto said screening medium at a central region thereof;

an open top hollow drum located beneath said screening medium and mounted to be rotatable about a substantially vertical axis, and drive means for rotating said screening medium and said drum whereby during said rotation said coarse particles in the solution deposited on the screening medium are caused to move over the screening medium radially outwardly of its axis of rotation to the periphery of the screening medium while liquid containing said fine particles passes through the screening medium into the drum wherein said drum has a closed lower end and is provided at its periphery with holes through which holes during rotation of the drum said liquid is displaced from the drum in a direction radially outwardly of the axis of rotation of the drum.

8. Apparatus as claimed in claim 7 in which the screening medium is substantially flat.

9. Apparatus as claimed in claim 8 in which the screening medium is carried on an upper rim of the open top hollow drum.

10. Apparatus according to claim 9 and further comprising a foraminous plate through which said suspension is deposited on the screening medium in proximity to the center of rotation of the screening medium.

11. Apparatus according to claim 10 and further comprising means for vibrating the screening medium in addition to rotation thereof.

12. Apparatus according to claim 11 wherein means defining a dam is provided around the periphery of the screening medium against which coarse particles may build up.

13. Apparatus according to claim 8 wherein the screening medium is provided with an impervious or imperforate annular band adjacent its periphery.

14. Apparatus according to claim 8 in which the lower end of the drum has a lower skirt member over which liquid displaced through the holes pass to enter a lower collecting launder having an outlet.

15. Apparatus according to claim 14 in which the upper end of the drum carries an annular skirt member over which said coarse particles in the solution displaced from the periphery of the screening medium pass to enter an upper collecting launder having an outlet.

* * * * *